Oct. 24, 1961 A. R. BRAULT ET AL 3,005,377

CAMERA DRIVE MECHANISM

Filed July 19, 1956 4 Sheets-Sheet 1

INVENTORS
ANDRE R. BRAULT
RALPH LINDBERG
BY
Bohleber, Fassett & Montstream
ATTORNEYS Oct. 24, 1961 A. R. BRAULT ET AL 3,005,377

CAMERA DRIVE MECHANISM

Filed July 19, 1956 4 Sheets-Sheet 2

INVENTORS
ANDRE R. BRAULT
BY RALPH LINDBERG

Bohleber, Fassett & Montstream

ATTORNEYS

Oct. 24, 1961 A. R. BRAULT ET AL 3,005,377

CAMERA DRIVE MECHANISM

Filed July 19, 1956 4 Sheets-Sheet 3

INVENTORS
ANDRE R. BRAULT
RALPH LINDBERG

BY Bohleber, Fassett & Montstream

ATTORNEYS

INVENTORS
ANDRE R. BRAULT
RALPH LINDBERG
BY
Bohleber, Fassett & Montstream
ATTORNEYS United States Patent Office 3,005,377
Patented Oct. 24, 1961

3,005,377
CAMERA DRIVE MECHANISM

Andre R. Brault, Merrick, and Ralph Lindberg, Malba, N.Y., assignors to OPTOmechanisms, Inc., Mineola, N.Y., a corporation of New York Filed July 19, 1956, Ser. No. 598,786
19 Claims. (Cl. 88—18)

The invention relates to a camera by means of which pictures or picture negatives may be taken at high speeds. The camera has many applications such as taking pictures of radar screens and taking pictures of rapid actions of any kind such as found in sporting events.

It is an object of the invention to construct a high speed camera having a very fast shutter.

Another object of the invention is to construct a high speed camera in which the shutter and film pulldown or transport mechanism is driven by a spring motor.

A further object is to construct a camera having a spring motor to drive the camera shutter and the film pulldown or transport mechanism and an electric motor to rewind the spring each time that an exposure is taken.

Another object is to construct a high speed camera in which the shutter and the film pulldown or transport mechanism is driven by a spring motor and the film is fed or looped during the winding of the spring motor.

A still further object is as in the preceding paragraph in which the spring motor is wound by an electric motor immediately after each exposure is taken.

Another object is to provide a camera having a spring motor, a solenoid to trip the spring motor controlled by a switch which is rendered inoperative until the spring motor has been rewound.

A further object is to construct a camera driven by a spring motor having a locking means to prevent unwinding of the spring which is partially released by the spring motor.

Another object is to construct a camera which does not use a clutch.

Again it is an object to construct a camera having a spring motor which is rewound by an electric motor controlled by an effective switching circuit.

Other objects of the invention will be more apparent from the following description when taken in connection with the accompanying drawings showing a preferred form of construction in which.

Figure 1:
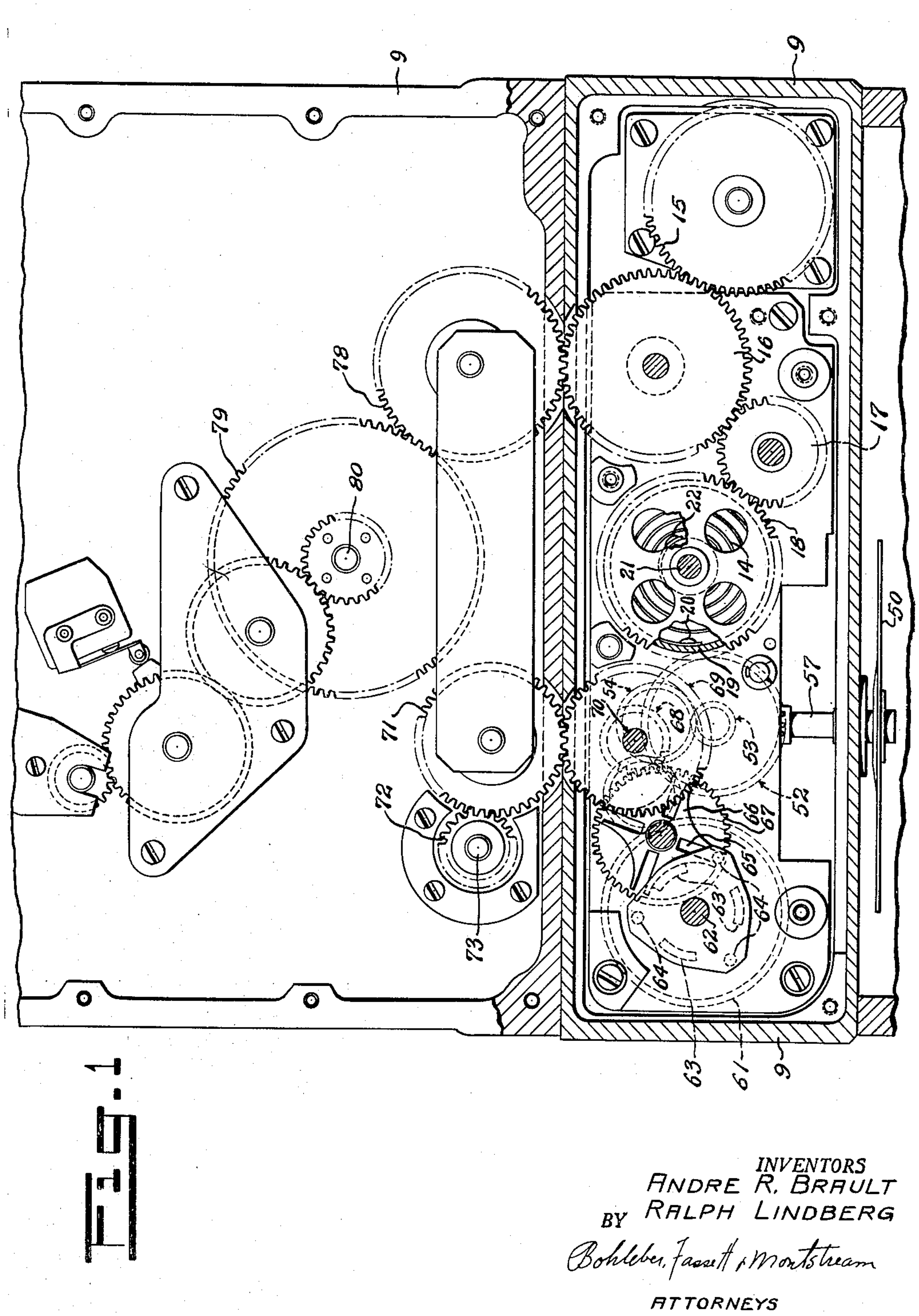
FIGURE 1 is a view of the camera drive mechanism on one side of a frame including the Geneva mechanism.
Figure 2:
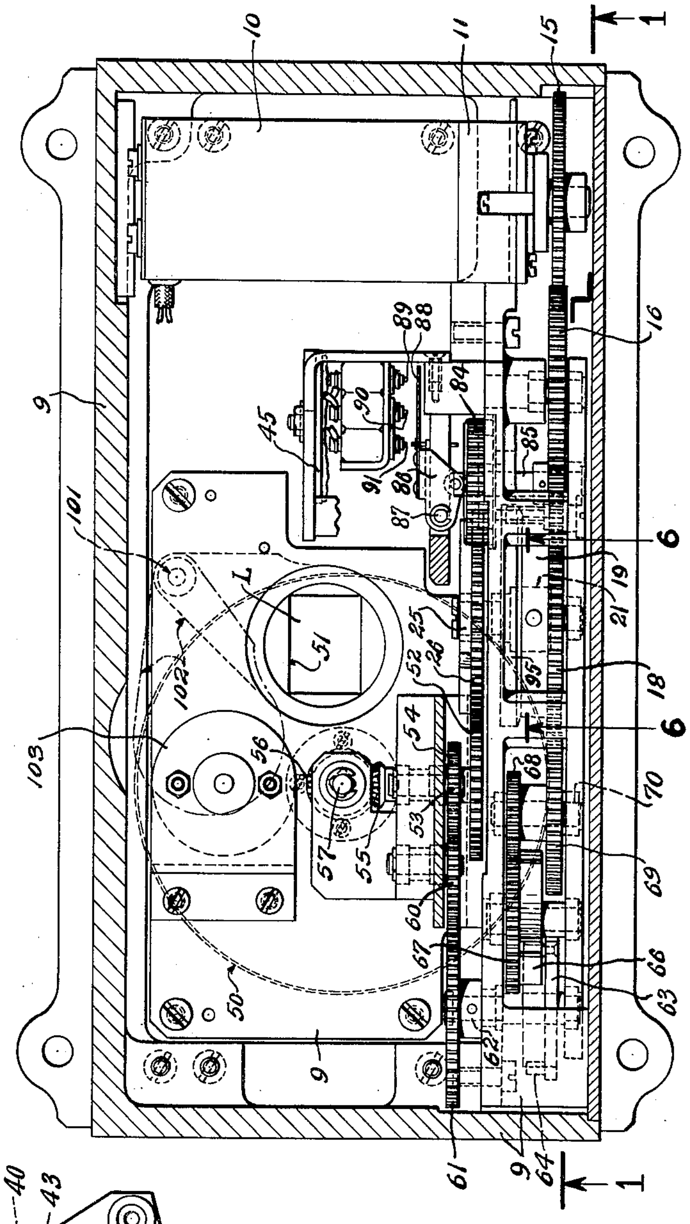
FIGURE 2 is another view of the camera drive mechanism and other mechanism.
Figure 11:
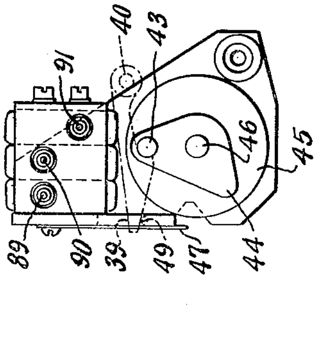
FIGURE 11 is the rotary solenoid and switches.

The camera mechanism is mounted on a frame 9 which is of complex form in order to secure compactness and made up of several parts all of which are designated a frame. The shutter and film transport mechanism for the camera are driven or operated by a spring motor which will be described hereinafter. The spring motor is rewound after each picture or exposure is taken by suitable winding means and preferably is wound by an electric motor 10. A D.C. motor is suitable, which operates on about 28 volts so that the camera may be portable and can be operated from a battery such as a storage battery or other power source. A storage battery may be carried with the camera or the camera may be connected with any other D.C. source. There is a gear reduction between the electric motor and the spring motor which will be different for different designs of the camera. Gear reductions of 18:1 and up to 100:1 are within present design areas. The motor used preferably has a high r.p.m. such as 26,000 so that it may be small and of low torque but with sufficient torque to wind a spring of substantial strength or power. The gear reduction may be provided with the electric motor as a motor unit or may be separate therefrom or both. The electric motor rotates in one direction only.

The electric motor or particularly the gear reduction forming a part of the motor unit is connected to the spring motor 14 by a driving mechanism such as by suitable gears, one gear 15 being carried on the shaft of the electric motor unit which in turn drives a gear 16. This gear drives a smaller gear 17 which in turn meshes with a gear 18 carried by an input member in the form of a housing 19 forming the input end of the spring motor. The spring of the spring motor may be of any form and is shown as a band coil spring for compactness. The spring of the spring motor has one end secured to the housing in any suitable manner such as by a screw 20. The spring motor includes an output member in the form of a spring motor shaft 21 rotatably mounted centrally of the housing and the other or inner end of the spring is secured thereto such as by a screw 22. Upon energization of the electric motor, the train of gears constituting the driving mechanism rotates the spring housing and thereby winds up or puts tension into the spring of the spring motor.

Figure 3:
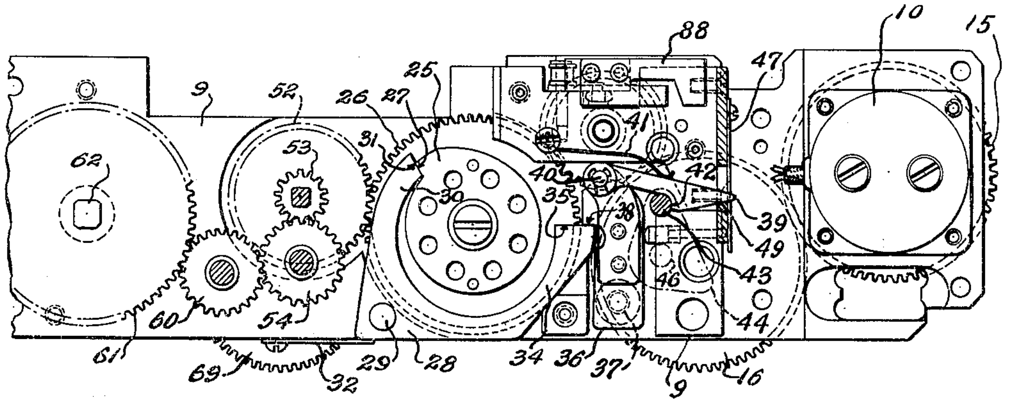
FIGURE 3 is a view of the drive mechanism on the other side of the frame showing the mechanism for locking the spring motor in wound condition and the release means therefor.

The output end or output member of the spring motor is connected with driven mechanism for rotating a rotary shutter and operating a film transport means. The driven mechanism or output member of the spring is prevented from unwinding when the spring motor is wound by suitable locking means (FIGURE 3). The locking means particularly shown includes a cam 25 secured to the spring motor shaft or a gear 26 which is secured to the spring motor shaft. The cam has a locking shoulder 27 shown particularly on the perpihery thereof. A latch 28 is provided of generally U-shaped form, or it may be described as generally circular since it surrounds a substantial portion of the cam periphery. The latch is pivoted to the frame on a pivot 29 and has a pair of arms, one being a locking arm 30 having a locking shoulder 31 which engages the locking shoulder 27 of the cam and prevents the same, the spring shaft and the driven mechanism to be described from being rotated by the wound spring. A latch spring 32 secured to the frame engages the latch 28 to assist in holding the latch in locking position.

Figure 5:
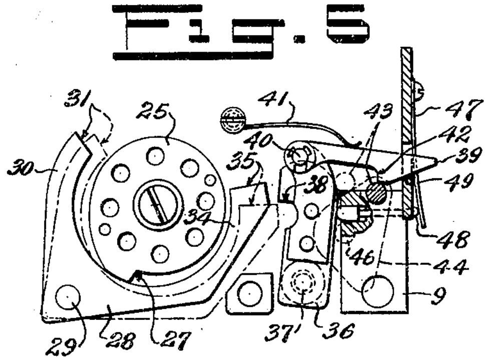
FIGURE 5 is a view of the release means for the locking latch for the spring motor in released position.

Any suitable means may be used to release the latch; however, a particularly effective release means is that illustrated. It includes the other arm 34 of the latch which forms a release arm having a shoulder 35. The latch is held in contact with the cam shoulder 27 or in locking position by a release lever 36 pivoted to the frame on a pivot 37. The release lever carries a release shoulder 38 which engages the shoulder 35 on the release arm of the latch. These shoulders 35 and 38 may have a camming angle with respect to the pivot so that its release is aided by the tension of the wound spring of the spring motor. A pawl 39 is pivotally mounted on a pivot 40 on the release lever at a point spaced from the pivot 36, and is held in the position illustrated in FIG. 3 by a spring 41, one end of which is anchored to the frame. The pawl has an operating shoulder 42 which is engaged by a pin 43 carried by a lever 44 shown in dot-dash lines. This lever may be manually operated to release or unlock the spring motor; however, for a radar and other set ups, it is carried and operated by the rotary armature of a solenoid 45, having a shaft 46 (FIGURES 3 and 5). A spring 47 engages one end of a push pin 48, the other end of which pin engages the release lever 36 and presses it into locking position or engagement with the release arm. The end of the pawl in its lock releasing movement rides up on a shoulder 49 so that the solenoid operating pin 43 is removed from engagement with the pawl shoulder 42.

The locking shoulders 27 and 31 are more effective if they have a camming angle with respect to the latch pivot 29 so that the wound spring of the spring motor acting through the angular locking shoulders as a cam presses the latch arm 30 outwardly against the pressure of the spring 32 when the release lever 36 has been pivoted outwardly to release position. This unlocks the spring motor and its pressure and driving force becomes active. The spring of the spring motor therefore serves two functions, first as a motor and secondly to unlock or release the latch 28. The latch spring 32 alone is insufficient to hold the latch in locking position against the fully wound spring of the spring motor. A fast release of the spring motor is secured by this locking means.

Upon energization of the solenoid, the pin 43 moves from the position shown in dotted line in FIG. 5 to the position shown in full lines behind the pawl shoulder 42 and in so moving raises the pawl by means of edge 49 against the pressure of the spring 41. When the solenoid is energized the pin moves to the right, from the position shown in FIG. 3, to that of FIG. 5, and in this movement pulls the pawl to the right which in turn pulls the release lever 36 to the right and disengages the release shoulder 38 of the release lever from engagement with the shoulder 35 of the release arm of the latch and the spring motor is unlocked. The spring motor drives the spring shaft or output member 21 through one revolution during which the periphery of the cam engages the release arm 34 to move the latch back to locking position so that the locking shoulder on the cam engages the locking shoulder 27 on the latch, to again lock the output side of the spring motor after one revolution of the cam. Upon the cam moving the latch and its release arm 34 to locking position, the release lever 36 and its shoulder 38 is moved into engagement with the shoulder 35. The latch is retained in locking position to lock the spring of the spring motor against unwinding by the release lever and the latch spring 32. The camera is ready for a second operation.

Release or unlocking of the spring motor operates the shutter and also operates the film transport or pulldown mechanism to move an unexposed film portion to exposure position. The shutter may be of any form, that shown being a disk 50 having an aperture 51 therein. The shutter is rotated one revolution to bring the aperture 51 away from the lens L and the light path between lens and film and return to initial position and close the shutter while the exposed portion of the film is being shifted from exposure position and an unexposed portion is moved to exposure position. The shutter is rotated by a gear 26 secured to the spring motor shaft and hence is on the output side of the spring motor. A gear train between the gear 26 and the shutter includes gears 52, pinion 53 carried by or secured to gear 52, gear 54, and a pair of bevel gears 55 and 56. The bevel gear 56 is secured to a rotatable shaft 57 to which the shutter is secured. One rotation of the spring motor gear 26 rotates the shutter one revolution. The aperture may be of any desired size and shape.

Figure 7:
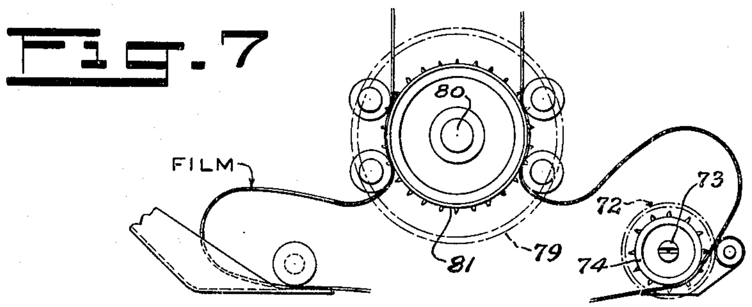
FIGURE 7 is a view of the film transport and film feed sprockets.
Figure 9:
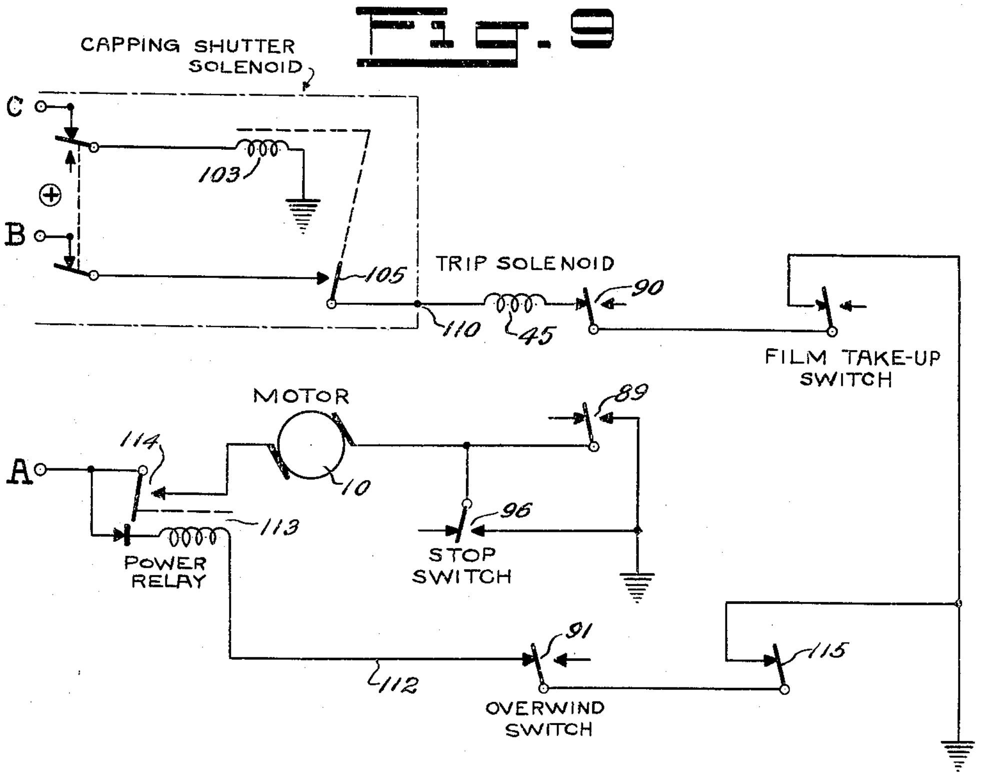
FIGURE 9 is a circuit diagram.

The film pulldown or transport mechanism is also driven by the spring motor through a Geneva mechanism. The gear 54 is connected with the gear 26 as described and drives a gear 60 which meshes with a gear 61 secured to a shaft 62. This shaft has a Geneva pin means shown as a plate 63 secured thereto. The plate carries three pins 64 each of which engages in one of the slots 65 of the Geneva wheel 66 when the plate rotates. There are four slots shown. One revolution of the spring motor gear 26 rotates the pin plate through one third of a revolution which in turn rotates the Geneva wheel one quarter of a revolution. A gear 67 is secured to the Geneva wheel which gear meshes with a pinion 68 connected with a gear 69 mounted on the same shaft 70. This gear rotates a gear 71 which meshes with a gear 72 mounted on a shaft 73 on which a film sprocket 74 (FIG. 7) is secured. The film is moved by the sprocket to transport the exposed portion of the film and an unexposed portion into exposure position in front of the lens during the time that the aperture in the rotary shutter is rotating and away from the light path. It will be noted, therefore, that the Geneva mechanism is a part of the film transport mechanism only.

The rotating shutter is not operated through the Geneva mechanism since in this way the full initial torque of the spring motor is used to overcome only the inertia of the shutter and its driving gears and the driving gears to and including the Geneva pin plate. The initial torque of the spring, therefore, does not drive the rest of the film transport mechanism since the pin first enters the slot of the Geneva wheel and torque is gradually applied thereto by virtue of the Geneva construction. Full spring torque is available therefore to overcome the inertia of starting the movement of the shutter and associated parts before any spring energy or torque is applied to the Geneva wheel 66 and its film transport means.

Preferably the film is fed into loops on one side of the film exposure position and a loop withdrawn on the other side so that the film pulldown or transport mechanism moves only that portion of the film of picture or exposure size to remove the exposed portion of the film from in front of the lens and move an unexposed portion into exposure position before the lens. In so going, a loop is taken up on the exposed side and a loop is made in the film strip on the unexposed side. The film is fed during the winding of the spring motor. In the construction shown which provides an electric motor to wind the spring, it is the electric motor, then, which drives the film feed mechanism to remove the film loop on the exposed side of exposure position and provide a new film loop on the unexposed film side.

The film feed mechanism includes a gear 78 which meshes with the gear 16 forming part of the gear train between the electric motor and the spring motor. This loop forming and loop removing operation takes place while the spring motor is being wound irrespective of how the spring motor is wound. If the spring motor is wound by an electric motor, as particularly illustrated, it is the electric motor which drives the film feed or film loop forming mechanism. Gear 78 drives gear 79 mounted upon a shaft 80 and a sprocket 81 (FIG. 7) is driven thereby. The film comes from a film magazine (not shown), engages one side of the sprocket 81, passes over exposure position and engages sprocket 74, then engages the other side of sprocket 81 and passes to a windup spool (not shown).

Switch means is provided to connect and disconnect the electric motor from the power source or storage battery and means is provided to operate the switch means. The switch means preferably includes a pair of switches. When the spring motor has been unwound, the switch means closes to energize the motor whereupon it rotates to rotate the spring housing as described and wind up the spring. When the spring is fully wound the switch means is disconnected to de-energize the motor.

Figure 4:
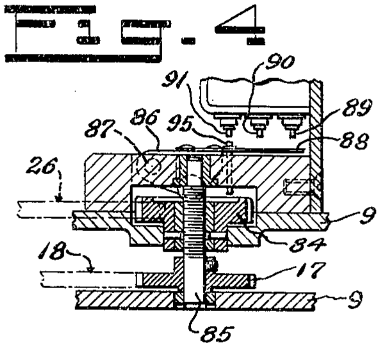
FIGURE 4 is a view in section of switch operating means.

The switch operating means includes a traveling gear 84 (FIG. 4) the bore of which is threaded and is mounted on a threaded shaft 85. The threaded shaft is connected to one of the parts including the input member and the output member and the traveling gear is connected with the other member. As particularly shown, the threaded shaft is secured to the gear 17 so that when the spring motor is being rewound the gear 17 rotates and turns threaded shaft 85 with the traveling gear held non-rotating by the gear 26 so that it is, or is the equivalent of, a nut and the traveling gear is moved axially to switch operating position which is upwardly in the figure. The traveling gear engages a switch lever 86 pivoted on the frame on pivot 87 and the lever carries a switch contact or operator 88. Pivoting of the lever brings the switch operator into engagement with the switch or switch buttons 89 and 90 to operate the switches as will appear. The operator 88 is desirably a bendable element so that precise location of parts is avoided. The traveling nut engages a push pin 95 to open a normally closed overwind switch 91 in the event rewinding becomes too great.

When the spring motor is unwinding, the threaded shaft 86 is held stationary. The traveling gear 84 meshes with the gear 26 carried on the output shaft or member of the spring motor which turns the traveling gear on the stationary threaded shaft to move the gear axially and the switch operator away from the switches or switch operated position or downwardly in FIGURE 4.

Locking means may be and desirably is provided to lock the input side or member of the spring motor to prevent back unwinding of the spring. If the gear ratio between the electric motor and the input member is great enough this locking means may be dispensed with. This second locking means includes a locking pawl 92 pivotally carried on a pivot pin 93 carried by the frame. The pawl engages behind a locking shoulder 94 carried by the spring housing 19. The shoulder may be provided in a flange 95 on the periphery of the spring housing. Means are provided connected with the input member to close and open the second motor switch 96 when the spring motor is being wound. The pawl 92 may conveniently operate this switch 96. The pawl carries a roller 97 which engages a switch operator 98 when the pawl is riding on the top of the flange 95 as the spring motor is being wound and presses the switch button 99 to close the switch. When the spring motor has been rewound the pawl moves behind the locking shoulder and the switch is opened.

Figure 8:
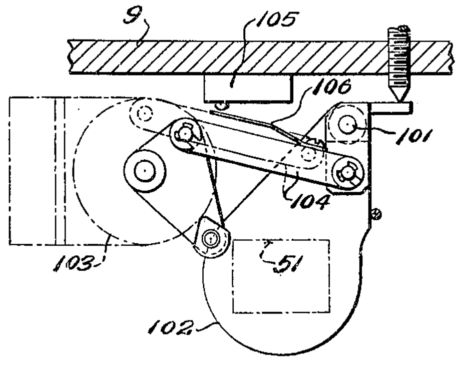
FIGURE 8 shows the capping shutter.
Figure 6:
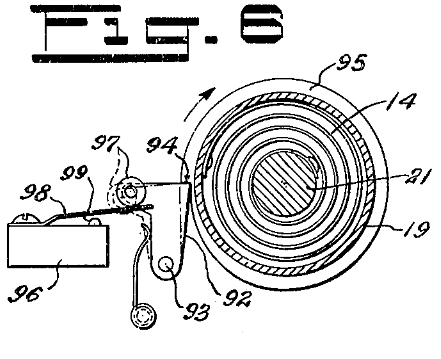
FIGURE 6 is a view of the locking means on the input side of the spring motor.

The camera may have a capping shutter 102 and it is used in the camera constructed for use such as in photographing a radar screen. The capping shutter is mounted on a pivot 101. It is operated by a rotary solenoid 103. (FIG. 8), the armature of which is connected with the shutter by a link 104. The solenoid receives an electric pulse which energizes the solenoid and holds the capping shutter open or away from the light path from the lens for the exposure time whereupon a spring in the solenoid restores the shutter to capping position. The link 104 carries an interlock switch 105 which is closed by an operator 106 when the capping shutter moves to open position.

For radar operation to take exposures automatically at timed intervals, a series of timed pulses are applied at C to the capping shutter solenoid 103 which moves the capping shutter to open position and holds it open for the duration of the pulse and hence times the exposure. This closes the interlock switch 105 so that the circuit through the trip solenoid 45 and normally closed switch 90 is closed. A short trip pulse is applied at timed intervals at terminal B just before the capping shutter closes and switch 105 opens which trip pulse energizes the trip solenoid 45 and releases the release lever 36 whereupon the latch arm 30 is released by the pressure of the spring motor as described and the spring motor unwinds to rotate and close the rotating shutter 50 and operate the film transport mechanism including the Geneva mechanism 63, 66 and the sprocket 74. When the aperture 51 returns to initial or open position the exposed portion of the film has been moved from exposure position and an unexposed film portion has been brought to exposure position.

The unwinding of the spring motor rotates the traveling gear 84 through gear 26 and it moves axially away from the switches to open switch 90 so that the trip solenoid cannot again be energized until the spring motor is rewound. There is a normally closed circuit from terminal A, through relay coil 113, switches 91 and 115 so this relay is energized and holds switch 114 closed. The traveling gear also closes normally open switch 89 so that a circuit is completed through the power relay switch, the electric motor 10, and switch 89 whereupon the motor starts to rewind the spring of the spring motor. The rewinding of the spring starts to return the traveling gear to initial position through gears 17, 18 and eventually opens switch 89 and closes switch 90.

For more precise control of the disconnection of the motor from the motor circuit and in order to assure a closed circuit for motor 10, the second switch 96 is provided. This switch is operated by the input member in any suitable manner, the construction shown being a simple form. The rewinding of the spring motor turns the flange 94 and moves the input or second locking means, which is pawl 92, outwardly to close the switch 96. This switch shunts switch 89 so that current continues to be supplied to the motor through switch 96 after switch 89 opens. These two switches comprise motor switch means. When the spring motor is fully rewound the shoulder 94 reaches pawl 92 which moves into locking position and switch 96 opens to break the motor circuit and stop the electric motor. During the rewinding of the spring motor the film feed mechanism is operated to turn the sprocket 81 which forms a loop in the film on the unexposed side and takes up the film loop on the exposed side. The camera is now ready for a second operation.

The camera may be constructed without a capping shutter in which event the rotary shutter is used to open and close the shutter. In this case the aperture 52 in the rotary shutter is located in a position a short distance from the light path from the lens to the film. There is a time interval in the rotation of the pin 64 before it enters a slot 65 and begins rotation of the Geneva wheel and operation of the transport means and its sprocket. It is during this interval that the aperture in the rotary shutter passes through the light path to make the exposure and immediately after the spring motor is triggered before the film transport mechanism operates. Very short exposure time is secured by this construction. By making the aperture of the rotating shutter smaller or larger the exposure time may be shortened or lengthened.

Figure 10:
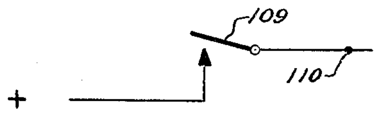
FIGURE 10 shows a manually operated switch.

For general use of the camera the switch 105, the capping shutter solenoid 103 and the capping shutter may be substituted by a manually operated switch 109 (FIG. 10) connected at the terminal 110. Upon the manual switch being closed the solenoid 45 moves the solenoid pin 43 to its trigger position behind the shoulder 42 and upon release of the manual switch, this pin pulls the release lever 36 to unlocked position and trips the spring motor as previously described. The operation of the camera is otherwise as previously described.

The circuit 112 also may include the normally closed overwind switch 91 which is operated or opened and closed by the traveling nut. If the motor should overwind the spring motor for any reason the traveling nut is moved farther and opens switch 91 which deenergizes solenoid 113 and opens the relay switch 114 in the motor circuit. The circuit may include other interlock switches such as an end of film switch 115 in the circuit 112 which switch is normally closed.

It will be noted that the spring motor drives the output member or shaft in one direction and the spring motor or input member or spring housing is rotated in the same direction to wind the spring motor. In other words the input member is held locked when the output member is rotated forwardly. The input member is then rotated forwardly to rewind the spring. It may be termed a progressive forward unwind and rewind.

This invention is presented to fill a need for improvements in a camera drive mechanism. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A camera drive mechanism for a camera having a film exposure position comprising a spring motor having ends, winding mechanism connected with one end of the spring motor including an input member, driving mechanism connected with the other end of the spring motor including an output member and a Geneva mechanism connected with the output member, the spring having one end secured to the input member and the other end secured to the output member, locking means connected with the driving mechanism of the spring motor to lock the same against unwinding, means independent of the winding mechanism and drive mechanism and connected with the locking means to release and relock the same for each operation of the shutter, a shutter connected with the driving mechanism between the output member and the Geneva mechanism, film transport means connected with the Geneva mechanism including a film transport sprocket adjacent to exposure position, and film feed means connected with the winding mechanism of the spring motor including a sprocket to feed film when the spring motor is wound.

2. A camera drive mechanism for a camera having a film exposure position comprising a spring motor having ends and an input member and an output member, the spring motor having one end secured to the input member and the other end secured to the output member, locking means connected with the output member of the spring motor to lock the same against unwinding and to relock the same, means independent of the input member and drive mechanism and connected with the locking means to release the same, a shutter connected with the output member of the spring motor, a Geneva mechanism connected with the output member, film transport means connected with the Geneva mechanism including a film transport sprocket adjacent to exposure position, and film feed means connected with the input member of the spring motor including a sprocket to feed film when the spring motor is wound.

3. A camera drive mechanism as in claim 2 including a second locking means connected with the input member to lock the spring motor against unwinding.

4. A camera drive mechanism as in claim 2 in which the locking means includes a locking cam connected with the output member and having a camming shoulder, a latch mounted on a pivot, the latch having a locking shoulder at a camming angle with respect to its pivot, a spring engaging the latch and propelling the same to locking position and exerting a pressure on the latch less than the unlocking pressure of the wound spring of the spring motor, and a release means engaging the latch and holding the latter in locking position.

5. A camera drive mechanism as in claim 4 in which the latch is U-shaped having a locking arm on one side of the locking cam and a release arm on the other side of the locking cam and engaged by the cam to propel the latch to locking position, and the release means engaging the release arm.

6. A camera drive mechanism for a camera having a film exposure position comprising a spring motor having ends and an input member connected with one end of the spring motor and an output member connected with the other end of the spring motor, an electric motor connected with the input member of the spring motor to wind the same, locking means connected with the output member of the spring motor and locking the same against unwinding of the spring motor, means independent of the winding mechanism and drive mechanism and connected with the locking means for the spring motor to release the locking means and restore the same to locking position to relock the output member, a shutter connected with the output member of the spring motor, film transport means connected with the output member of the spring motor including a film transport sprocket, a motor circuit connected with the electric motor including motor switch means, and switch operating means connected with the spring motor and the motor switch means to close and open the latter upon unwinding and winding of the spring motor respectively, and film feed means connected with the electric motor and having a sprocket.

7. A camera drive mechanism as in claim 6 including locking means connected with the input member of the spring motor to lock the same against unwinding.

8. A camera drive mechanism as in claim 6 in which the locking means includes a cam connected with the output member and having a locking shoulder, a U-shaped latch having a pivot pivotally mounting the same adjacent to the cam and having a locking arm and a release arm, a cooperating locking shoulder carried by the locking arm for engaging the shoulder on the cam, the means to release the locking means including a locking shoulder carried by the release arm of the U-shaped lever, a pivoted release lever engaging the locking shoulder to hold the U-shaped lever against pivotal movement, and means to pivot the release lever to release the U-shaped latch.

9. A camera drive mechanism as in claim 8 in which the locking shoulder on the cam and the locking arm is at a camming angle with respect to its latch pivot, and a spring engaging the U-shaped lever to aid in holding the latter in locking position and having a tension on the U-shaped lever less than that of the wound spring of the spring motor.

10. A camera drive mechanism as in claim 6 including locking means connected with the input member to lock the spring motor against unwinding, the motor switch means including a first switch, means connected with the input member and the output member to close and open the first switch, and a second switch in parallel with the first switch and connected with the locking means for the input member to close and open the second switch.

11. A camera drive mechanism for a camera having a film exposure position comprising a spring motor having ends and an input member and an output member, the spring motor having one end secured to the input member and the other end secured to the output member, locking means connected with the output member of the spring motor to lock the same against unwinding, means independent of the winding mechanism and drive mechanism to release and reengage the locking means including a solenoid and a normally closed switch in circuit with the solenoid, a shutter connected with the output member of the spring motor, Geneva mechanism connected with the output member, film transport means connected with the Geneva mechanism including a film transport sprocket adjacent to exposure position, film feed means connected with the input member of the spring motor including a sprocket to feed film when the spring is being wound, an electric motor connected with the input member to wind the spring motor, a motor circuit connected with the electric motor including switch means, and switch operating means connected with the output member and the input member to close the motor circuit switch means and open the solenoid switch upon release of the spring motor and to open said motor circuit switch means and close the solenoid switch upon rewinding of the spring motor.

12. A camera drive mechanism as in claim 11 in which the switch means includes a pair of switches connected in parallel, one of said parallel switches being operated by the switch operating means, a second locking means connected with the input member to prevent unwinding of the spring motor, and means connecting the second locking means with the other parallel switch to close and open the same upon winding and unwinding of the spring.

13. A camera drive mechanism as in claim 11 including an overwind circuit connected in parallel with the motor circuit having a power relay solenoid, a normally open switch in the motor circuit operated by the relay solenoid, and an overwind switch, the overwind switch being opened by excessive movement of the switch operating means.

14. A camera drive mechanism for a camera having a film exposure position comprising a spring motor having ends and an input member connected with one end of the spring motor and an output member connected with the other end of the spring motor, locking means connected with the output member of the spring motor and locking the same against unwinding of the spring motor, a solenoid connected with the locking means for the spring motor to release and reengage the same, a normally open switch and a normally closed switch connected in series with the solenoid and with each other, a shutter connected with the output member of the spring motor, film transport means connected with the output member of the spring motor including a film transport sprocket, and switch operating means connected with the input member and with the output member of the spring motor to open and close the normally closed solenoid switch and close and open the normally open solenoid switch upon unwinding and winding of the spring motor.

15. A camera drive mechanism for a camera having a film exposure position comprising a spring motor having ends and an input member connected with one end of the spring motor and an output member connected with the other end of the spring motor, locking means connected with the output member of the spring motor and locking the same against unwinding of the spring motor; means to release and reengage the locking means for the spring motor including a solenoid connected with the locking means, a normally open switch in series with the solenoid, and a normally closed switch in series with the solenoid; a shutter connected with the output member of the spring motor, film transport means connected with the output member of the spring motor including a film transport sprocket, switch operating means connected with the input member and with the output member of the spring motor to open the normally closed solenoid switch upon unwinding of the spring motor and to close this switch upon winding of the spring motor.

16. A camera drive mechanism for a camera having a film exposure position and a light path comprising a spring motor having ends and an input member connected with one end of the spring motor and an output member connected wtih the other end of the spring motor, means connected with the input member of the spring motor to wind the same, locking means connected with the output member of the spring motor and locking the same against unwinding of the spring motor; means to release and reengage the locking means for the spring motor including a solenoid connected with the locking means for the spring motor, a normally open switch in series with the solenoid, and a normally closed switch in series with the solenoid; a rotary shutter connected with the output member of the spring motor, film transport means connected with the output member of the spring motor including a film transport sprocket adjacent the film exposure position, switch operating means connected with the input member and with the output member of the spring motor to open the normally closed solenoid switch upon unwinding of the spring motor and to close this switch upon rewinding of the spring motor, a capping shutter mounted for movement from and to a position in the light path, means to operate the capping shutter, and means operated by the capping shutter to close and open the normally open solenoid switch.

17. A camera drive mechanism for a camera having a film exposure position and a light path comprising a spring motor having ends and an input member connected with one end of the spring motor and an output member connected with the other end of the spring motor, an electric motor connected with the input member of the spring motor to wind the same, locking means connected with the output member of the spring motor and locking the same against unwinding of the spring motor; means to release and reengage the locking means for the spring motor including a solenoid connected with the locking means for the spring motor, a normally open switch in series with the solenoid, and a normally closed switch in series with the solenoid; a rotary shutter connected with the output member of the spring motor, film transport means connected with the output member of the spring motor including a film transport sprocket adjacent to film exposure position, a motor circuit connected with the electric motor including a normally closed motor switch, switch operating means connected with the input member and with the output member of the spring motor to open the normally closed solenoid switch upon unwinding of the spring motor and to close this switch upon winding of the spring motor and to close and open the motor switch, a capping shutter mounted for movement from and to a position in the light path, means to operate the capping shutter, and means operated by the capping shutter to close and open the normally open solenoid switch.

18. A camera drive mechanism for a camera having a film exposure position and a light path comprising a spring motor having ends and an input member connected with one end of the spring motor and an output member connected with the other end of the spring motor, an electric motor connected with the input member of the spring motor to wind the same, locking means connected with the output member of the spring motor and locking the same against unwinding of the spring motor; means to release and reengage the locking means for the spring motor including a solenoid connected with the locking means for the spring motor, a normally open switch in series with the solenoid; and a normally closed switch in series with the solenoid; a rotary shutter connected with the output member of the spring motor, film transport means connected with the output member of the spring motor including a film transport sprocket, a motor circuit connected with the electric motor including a first motor switch and a second motor switch, both switches being normally open and connected in parallel, switch operating means connected with the input member and with the output member of the spring motor to open the normally closed solenoid switch upon unwinding of the spring motor and to close this switch upon winding of the spring motor and to close and open the first motor switch, means connected with the input member to close and open the second motor switch, a capping shutter movable from and to a position in the light path, means to operate the capping shutter, and means operated by the capping shutter to close the normally open solenoid switch.

19. A camera drive mechanism as in claim 18 including a second locking means connected with the input member to lock the spring motor against unwinding, and the means to close and open the second motor switch is connected with the second locking means.

References Cited in the file of this patent

UNITED STATES PATENTS

| | | |
|---|---|---|
| 929,743 | Wooden | Aug. 3, 1909 |
| 1,085,477 | Phillips | Jan. 27, 1914 |
| 1,301,358 | Beckman | Apr. 22, 1919 |
| 1,311,447 | Holst et al. | July 29, 1919 |
| 1,510,309 | Collier et al. | Sept. 30, 1924 |
| 2,023,493 | Stanford | Dec. 10, 1935 |
| 2,227,240 | Becker et al. | Dec. 31, 1940 |
| 2,256,207 | Leitz et al. | Sept. 16, 1941 |
| 2,398,133 | Cronholm | Apr. 9, 1946 |
| 2,441,185 | Brown et al. | May 11, 1948 |
| 2,569,031 | Warner et al. | Sept. 25, 1951 |
| 2,571,795 | Tyler et al. | Oct. 16, 1951 |
| 2,664,037 | Debrie | Dec. 29, 1953 |
| 2,759,561 | Bolsey | Aug. 21, 1956 |
| 2,794,520 | Engelage et al. | June 4, 1957 |
| 2,795,175 | Foster et al. | June 11, 1957 |